United States Patent
Hurst-Hiller et al.

(10) Patent No.: US 7,676,517 B2
(45) Date of Patent: Mar. 9, 2010

(54) SEARCH RESULTS INJECTED INTO CLIENT APPLICATIONS

(75) Inventors: Oliver Hurst-Hiller, Seattle, WA (US); Srinivasa V. Thirumalai-Anandanpillai, Redmond, WA (US); Neel I. Murarka, San Francisco, CA (US); Marek L. Gorecki, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 11/250,744

(22) Filed: Oct. 14, 2005

(65) Prior Publication Data

US 2007/0088686 A1    Apr. 19, 2007

(51) Int. Cl.
G06F 7/00    (2006.01)
G06F 17/30    (2006.01)

(52) U.S. Cl. ..................................... 707/713
(58) Field of Classification Search ............. 707/4, 707/2, 3, 203, 200, 5, 6, 7; 726/22, 26, 27; 719/310, 331, 316; 715/500, 505, 513, 532, 715/716, 738, 762
See application file for complete search history.

(56) References Cited

U.S. PATENT DOCUMENTS

| | | | |
|---|---|---|---|
| 4,931,935 A | 6/1990 | Ohira et al. | |
| 5,845,300 A | 12/1998 | Comer et al. | |
| 6,144,958 A | 11/2000 | Ortega et al. | |
| 6,169,986 B1 | 1/2001 | Bowman et al. | |
| 6,182,091 B1 | 1/2001 | Pitkow et al. | |
| 6,308,649 B1 * | 10/2001 | Gedeon ................. | 114/39.11 |
| 6,401,084 B1 | 6/2002 | Ortega et al. | |
| 6,513,036 B2 | 1/2003 | Fruensgaard et al. | |
| 6,522,740 B2 * | 2/2003 | Baldwin ............... | 379/207.02 |
| 6,564,213 B1 * | 5/2003 | Ortega et al. ............... | 707/5 |

(Continued)

FOREIGN PATENT DOCUMENTS

KR    1020010064751 A    7/2001

(Continued)

OTHER PUBLICATIONS

Google Suggest; What is Google Suggest? Google, 2004. http://labs.google.com//suggestfaq.html. Last accessed Oct. 14, 2005. 2 pages.

(Continued)

*Primary Examiner*—Mohammad Ali
*Assistant Examiner*—Alexey Shmatov
(74) *Attorney, Agent, or Firm*—Shook, Hardy & Bacon, L.L.P.

(57) ABSTRACT

Architecture is provided that transcends a division offered by conventional query architectures by providing a query input box in a client application which provides rich look-ahead query results by integrating results from a network-based service with results from the client application. Realtime network-based search results are injected into the query as the user types the query into a client input box. When a user enters a query character into a query input box of a client application, a search is conducted via an Internet-based index service using the existing query character. In response, the search returns suggested results that are then processed to complete the query as presented for selection by the user in the query input box.

18 Claims, 19 Drawing Sheets

U.S. PATENT DOCUMENTS

| | | | |
|---|---|---|---|
| 6,654,742 B1 | 11/2003 | Kobayashi et al. | |
| 6,678,681 B1 | 1/2004 | Brin | |
| 6,725,259 B1 | 4/2004 | Bharat | |
| 6,745,195 B1 * | 6/2004 | Kornfein et al. | 707/102 |
| 6,766,069 B1 | 7/2004 | Dance et al. | |
| 6,772,150 B1 | 8/2004 | Whitman et al. | |
| 6,853,993 B2 | 2/2005 | Ortega et al. | |
| 6,862,586 B1 | 3/2005 | Kreulen et al. | |
| 6,871,202 B2 | 3/2005 | Broder | |
| 2004/0010484 A1 * | 1/2004 | Foulger et al. | 706/50 |
| 2006/0129531 A1 * | 6/2006 | Bates | 707/3 |
| 2007/0050339 A1 * | 3/2007 | Kasperski et al. | 707/3 |
| 2007/0055652 A1 * | 3/2007 | Hood et al. | 707/3 |

FOREIGN PATENT DOCUMENTS

| | | | |
|---|---|---|---|
| KR | 1020020003915 A | 1/2002 | |

OTHER PUBLICATIONS

Snap is a Better Way to Use the Web. Perfect Market Technologies, Inc., 2005. http://www.snap.com/about/about.php?last_link_type=about. Last accessed Oct. 14, 2005. 1 page.

MSN Search Toolbar. Microsoft Corporation, 2005. http://toolbar.msn.com//tour_suite/start.aspx. Last accessed Oct. 14, 2005. 1 page.

Mac OS X Tiger; Find stuff without even looking. Apple Computer, 2005. http://www.apple.com/macosx/overview. Last accessed Oct. 14, 2005. 4 pages.

Answers.com; 1-Click Answers™ for Windows puts answers at your fingertips with three time-saving features. GuruNet, 1999-2005. http://www.answers.com/main/product_info.jsp. Last accessed Oct. 14, 2005. 2 pages.

International Search Report dated Mar. 16, 2007 mailed Mar. 16, 2007 for PCT Application Serial No. PCT/US2006/039193, 3 Pages.

* cited by examiner

SEARCH RESULTS INJECTED INTO CLIENT APPLICATIONS

BACKGROUND

With the advent of the Internet, enormous amounts of information have been made accessible via the network to users of all skill levels and backgrounds. This also applies to technological advances in hardware storage systems that facilitate storing large amounts of data (e.g., gigabytes and terabytes) on a user's home computer. Users, both home and professional, are now prone to store anything and everything since the cost to do so is becoming cheaper. However, searching through these large amounts of data then becomes problematic.

Many text input and search result interfaces have benefited from so-called "word-wheel" interfaces, also known as look-ahead, auto-complete, etc., whereby query suggestions or search results are displayed and adjust in response to each user keystroke. The user is given immediate feedback on the likely success of the formulation of their input; they can enter input more quickly, and even complete their task without even hitting Enter.

There are many popular commercial word-wheel examples. Always-on Internet connections, broadband connections, and protocols have enabled amazing interaction responsiveness in which keystrokes and results are exchanged over the wire in a seamless user experience.

However, to date, these systems are limited in scope by the data systems they access when attempting to provide their suggestions, completions, etc. For example, client-based systems such a browser address box and webpage desk bars only supply results from local lists and indices, while Internet-based systems only supply results from Internet-based lists and indices.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation transcends the division offered by conventional architectures by providing a query input box in a client application which provides richer look-ahead query results by integrating results from a network-based service (e.g., Internet-based services) with results from the client application. In other words, realtime network-based search results are injected into the query as the user types the query into a client input box. When a user enters a query character into a query input box of a client application, a search is conducted via an Internet-based index service using the existing query character. In response, the search returns suggested results that are then processed to complete the query as presented for selection by the user in the query input box.

Accordingly, the invention disclosed and claimed herein, in one aspect thereof, comprises a system that facilitates query processing. The system includes a query component that facilitates input of a portion of query data into a client application, and a search component that accesses a network-based service to suggest additional query data in response to receiving the portion of the query data and communicates the additional query data to the query component for presentation to a user.

In another aspect of the subject invention, personalized customization of the query is provided by accessing user-related data that narrows the injected query data according to user-related information.

In yet another aspect thereof, personalization of the results is provided by narrowing the search results according to user interactions and user information.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
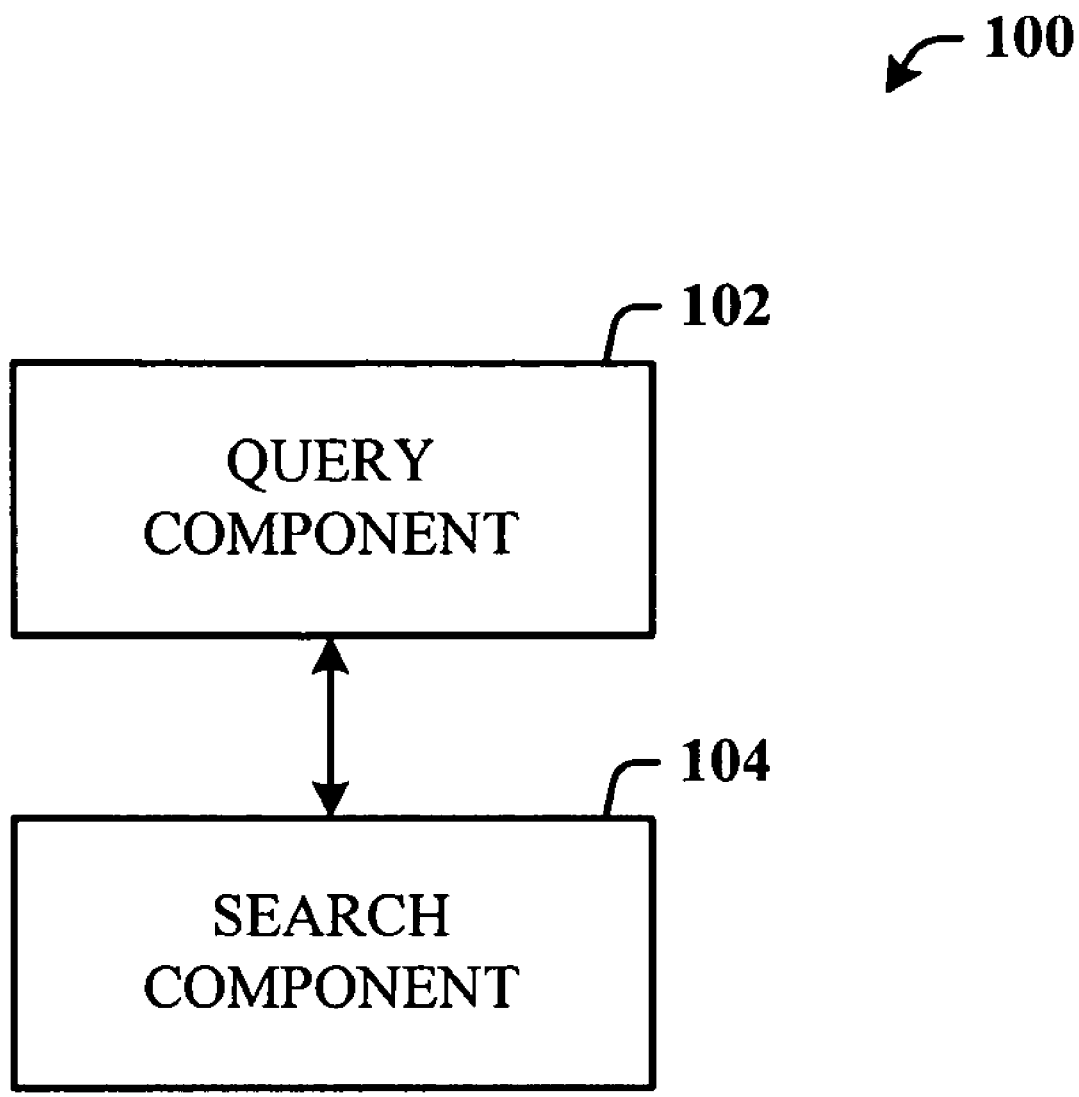
FIG. 1 illustrates a system that facilitates query processing in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that facilitates query processing in accordance with an innovative aspect. The system 100 transcends the division offered by conventional architectures by providing a query input box in a client application which provides richer look-ahead query results by integrating results from a network-based service (e.g., Internet-based services) with results from the client application. In other words, realtime network-based search results are injected into the query as the user types the query into a client input box. When a user enters a query character into a query input box of a client application, a search is conducted via an Internet-based index service using the existing query character. In response, the search returns suggested results that are then processed to complete the query as presented for selection by the user in the query input box.

Accordingly, the system 100 includes a query component 102 that facilitates input of a portion of query data into a client application, and a search component 104 that accesses a network-based service to suggest additional query data in response to receiving the portion of the query data and communicates the additional query data to the query component 102 for presentation to a user.

Figure 2:
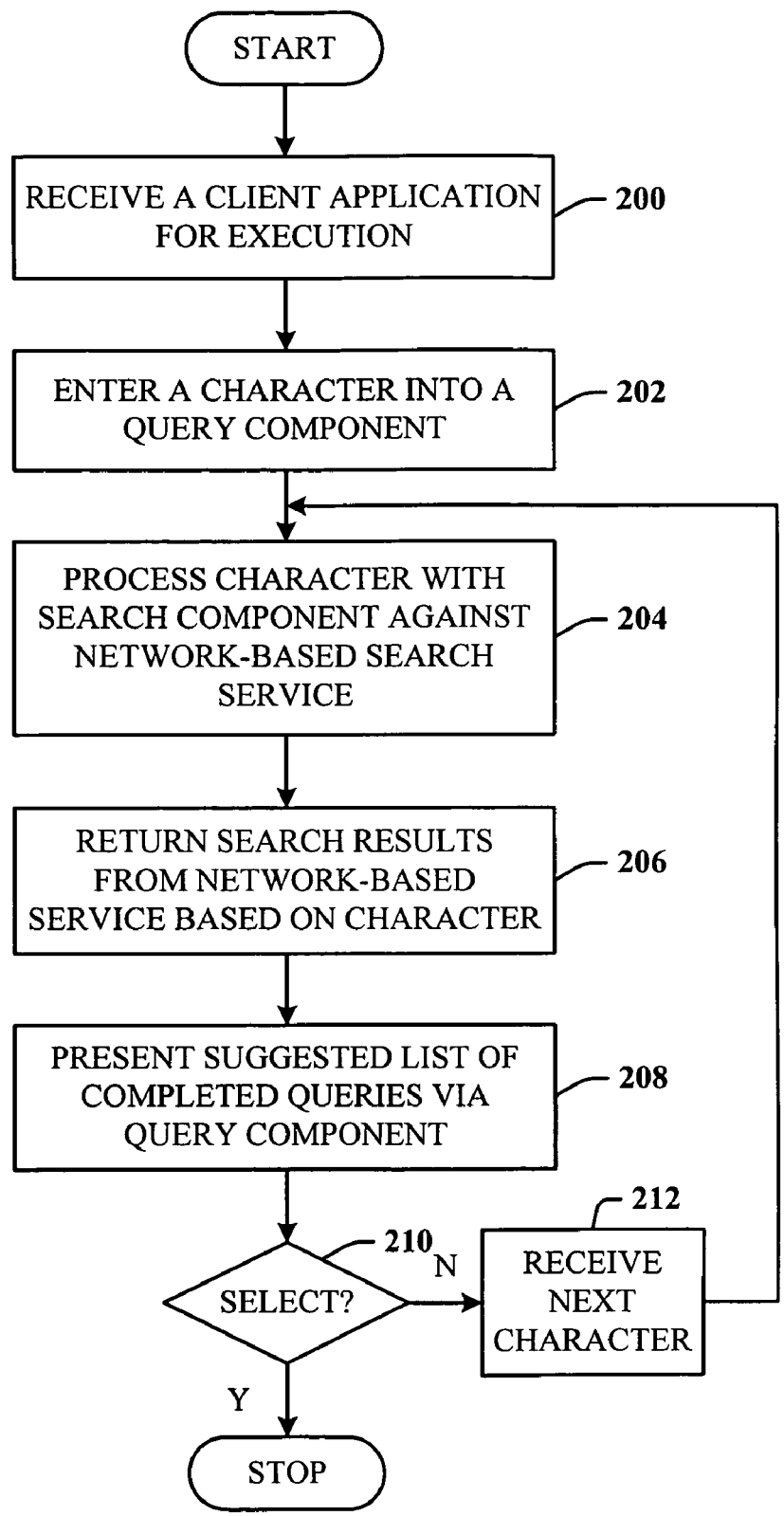
FIG. 2 illustrates a methodology of query processing in accordance with an innovative aspect.

FIG. 2 illustrates a methodology of query processing in accordance with an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a client application is received for execution. At 202, a user enters a query character into a query input box of the client application. At 204, the character is processed in realtime against an indexed network-based (e.g., Internet based service) search service. At 206, search results are returned from the network-based service, based on the character entered. At 208, a suggested list of search results is presented to complete the query in the query input box. At 210, the system determines if the user has selected one of the suggested queries. If so, the search results are presented and the query process stops. Alternatively, if the user has not selected one of the suggested queries, flow is from 210 to 212 to receive the next query character as entered by the user in the query input box. Flow is then back to 204 to process the existing combination of characters against the network-based index service and provide a new suggested list of search results in the query input box.

Figure 3:
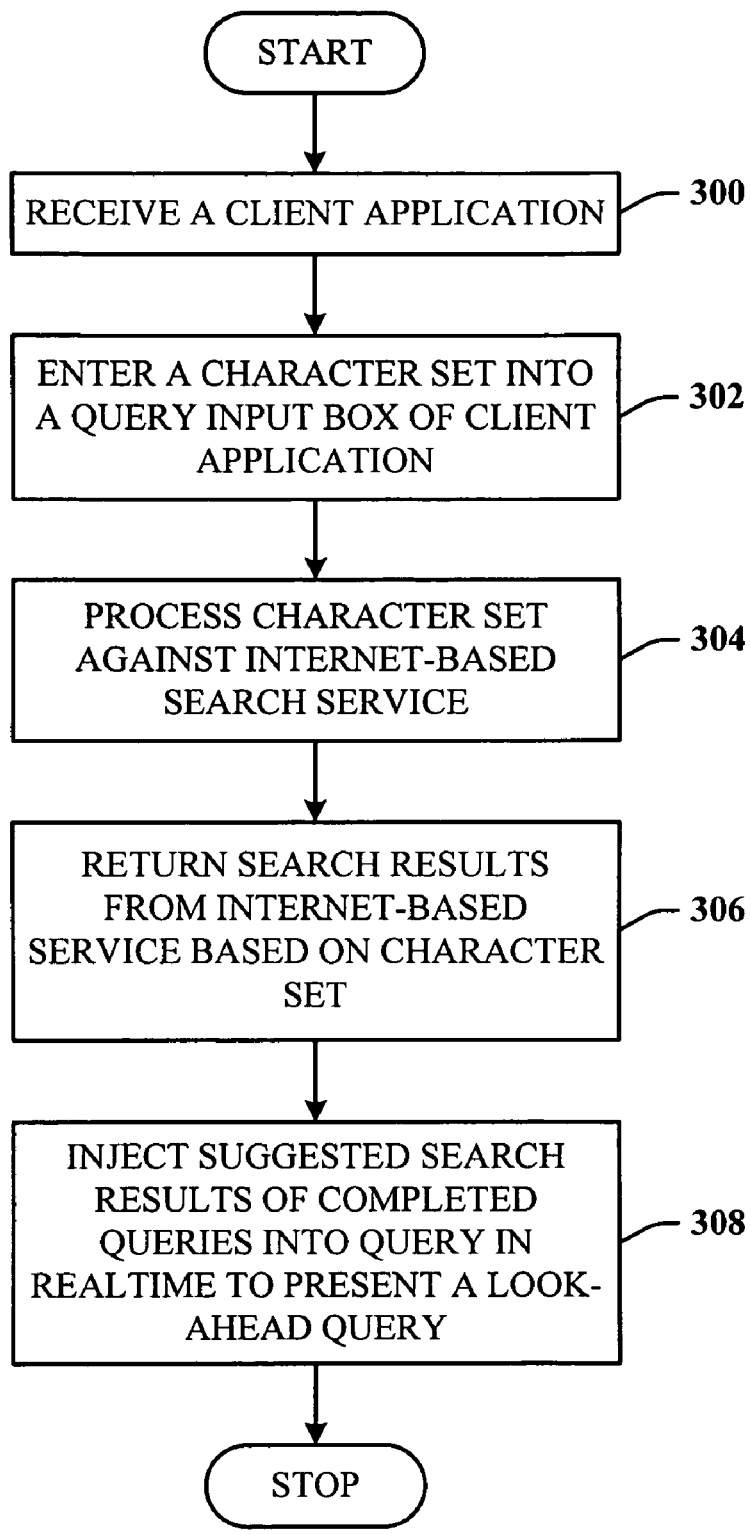
FIG. 3 illustrates an alternative methodology of processing a query in accordance with another aspect.

Referring now to FIG. 3, there is illustrated an alternative methodology of processing a query in accordance with another aspect. At 300, a client application is received. At 302, the user enters a set of characters (at least two) into a query input box of the client application. At 304, the multiple characters are processed against an Internet-based index service. At 306, search results are returned from the Internet-based service based on the character set processed. At 308, suggested search results of completed queries are injected into the query input box in realtime to present a look-ahead query.

Figure 4:
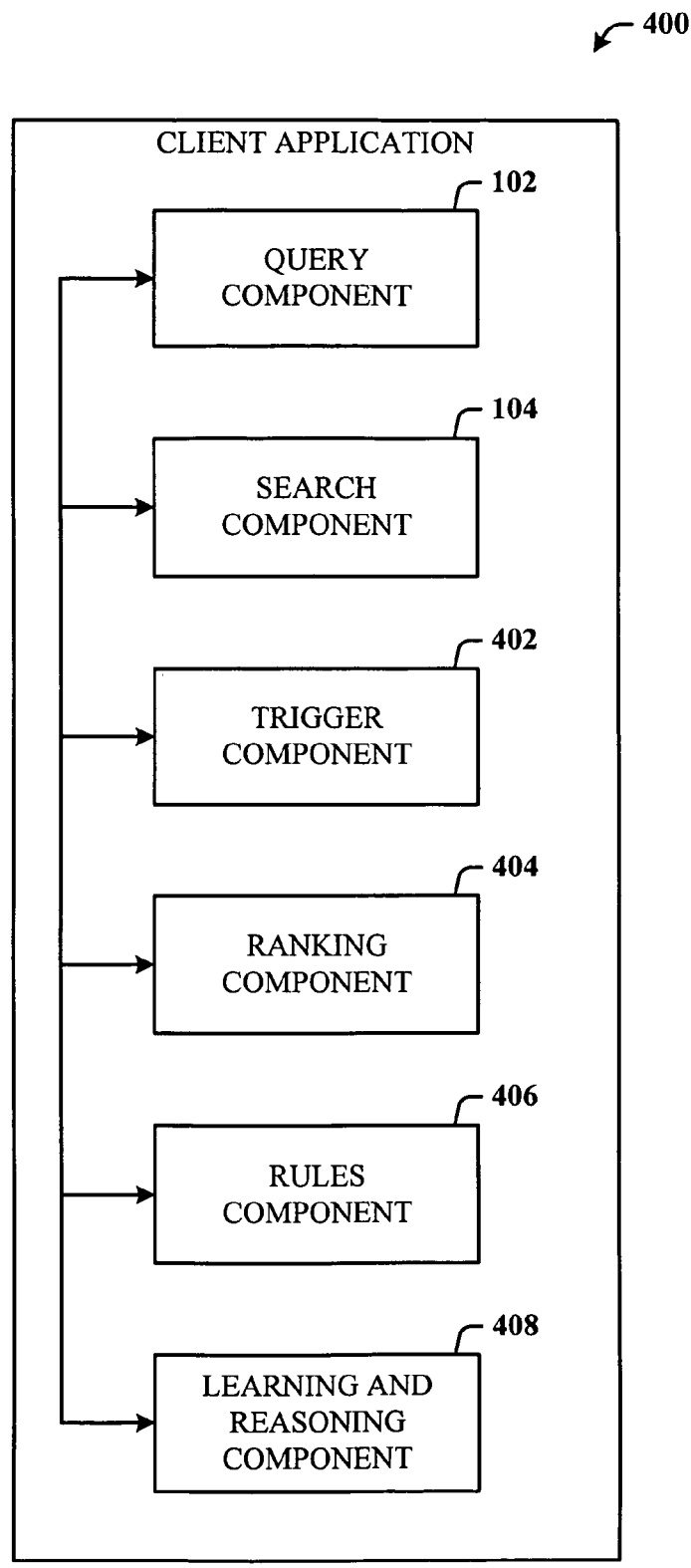
FIG. 4 illustrates a client application that employs components which facilitate look-ahead query processing in accordance with an innovative aspect.

FIG. 4 illustrates a client application 400 that employs components which facilitate look-ahead query processing in accordance with an innovative aspect. In this implementation, the application 400 can include the query and search components (102 and 104) of FIG. 1, along with a trigger component 402, a ranking component 404, a rules component 406, and a learning and reasoning component 408.

The trigger component 402 facilitates the inclusion of other data to affect the query process. For example, personalization information such as user profile information can be processed to refine or narrow the search results. The user profile information can include preferences about which sites to not visit, which sites should always be visited first, and so on. Other personalization information can include historical data tracked and stored from previous searches (e.g., in a Favorites file, History files . . . ). Thus, this personalized trigger information can be accessed locally from other applications of the user machine or device to impact how the query will be processed for look-ahead realtime presentation.

The trigger component 402 can also facilitate impacting, refining or filtering the search results as they are being returned to the user. Thus, a personalization of search results can be achieved by considering, again, user preferences information, frequently accessed websites (e.g., a history file), and/or a preferred set of websites (e.g., a favorites file), for example. In one example, if the user begins entering characters "h-o-t", the most common site might be Hotmail, but based on the user browsing history, the application would actually know that Hot Jobs is the website the user wants to access. Other personalization information can include the time of day that the user typically would access a given website. For example, if the user typically accesses MSN-.com in the morning between 8-9 AM, this information can be used to refine the query and the search results.

The ranking component 404 facilitates ranking the results. Ranking criteria can, again, be based on personalized information such as preferred websites, preferred query terms (as learned form past query entries), and so on.

The rules component 406 can store and process any number of rules that can be created by the user and/or can be passed down from the Internet service. The user-defined rules can be created via the client application through which the query is being made or any other associated client application on the client machine, for example. One example of a rule is to "only consider query options X and Y during a given time span of any day". Another rule can be to "execute rules A and B when detecting input string h-o-t in the query input box". It is to be understood that these are only but a few examples of the many rules that can be user-defined for query processing in accordance with the subject innovation.

The client application 400 can also include an optional machine learning and reasoning (LR) component 408 which facilitates automating one or more features in accordance with the subject innovation. The subject invention (e.g., in connection with selection) can employ various LR-based schemes for carrying out various aspects thereof. For example, a process for determining what rules to impose can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining according to a predetermined criteria, the following example implementations.

The LR component 408 can learn user interactive aspects and automate later interactions based on the previously learned aspects. For example, if the user is a power user as learned by prior user interactions, the LR component 408 can determine this and further automate the user experience by moving quickly between query presentations and jumping directly to look-ahead operations and results processing. Alternatively, if by way of user interaction the LR component 408 determines that the user is more of a novice user, automations can be limited to allow the user to more slowly perceive aspects of the query completion process and search results. However, as the user becomes more skilled during the query process, the LR component 408 will learn this and automate more features or aspects of the query completion process and search results.

In another implementation, the LR component 408 automatically generates rules that can be executed based on user interaction. For example, as the user regularly interacts with a particular website, the LR component 408 can create a rule that limits other website results as the look-ahead query operation is being processed. Thus, user interactions over time can be automatically memorialized as a rule and stored in the rule component 406 for activation at any time. Another example, is if the user routinely mistypes words, these mistypes words will eventually be resolved by user correction, application spell checking, and so on. The LR component 408 can learn these regularly mistyped words, associate them with the correct spellings, and utilize them in the look-ahead query input and search results processing. This precludes the user from having to manually insert the routinely mistyped word in the application dictionary, which thereafter will automatically correct the mistyped word upon entry.

In yet another implementation, the LR component 408 learns and associates user interactions with specific client applications. For example, if the user typically enters a query while in a spreadsheet application, and which query results in accessing a particular website, this association can be learned and stored in association with the spreadsheet application, but not another client application. However, it can be learned that the interaction information can apply to more than one client application.

In still another example, the LR component 408 can learn to increase or decrease the number of characters automatically input into the query input box in the realtime look-ahead format based on user interaction and learning if the user is more of a power user versus a novice user. The learning can be based on how fast the user types, non-use of the suggested characters and/or search results when ultimately they do use a suggested result, the number of spelling mistakes, and so on.

It is to be understood that these are only but a few examples of the power that the LR component 408 can provide in enhancing the user experience of the subject innovation. For example, the LR component 408 can also be employed in ranking the search results based on learned user interaction and query inputs. In one implementation, the user can manually adjust a slide bar (or some other user control input) to increase automations of processes or decrease them. For example, the user can manually configure the system to perform a search only after three characters have been entered, instead for each character. In a more robust implementation, the number user input characters used for a search can increase or decrease dynamically based on user interaction, and the type of information being searched. For example, where a URL (uniform resource locator) is being entered, there may be no need to search on a character-by-character basis, but to dynamically increase by 2-3 characters at a time and then back down to a single character at a time later in the entry process.

Figure 5:
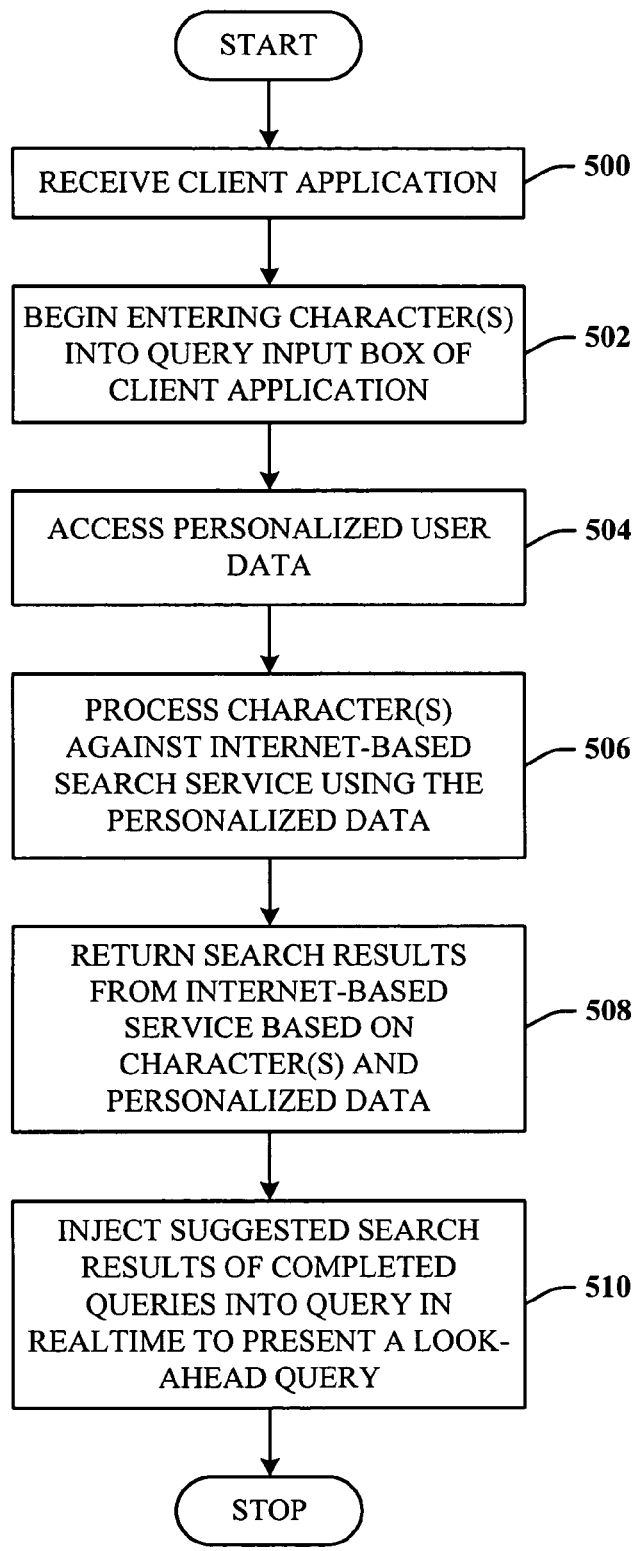
FIG. 5 illustrates a methodology of utilizing personalized information to narrow the query search in accordance with another aspect of the innovation.

FIG. 5 illustrates a methodology of utilizing personalized information to narrow the query search in accordance with another aspect of the innovation. At 500, a client application is received. At 502, one or more characters (e.g., alphanumeric, Unicode . . . ) are input one at a time into a query input box of the client application. At 504, personalized information (e.g., history data, favorites list, user preferences . . . ) is accessed. At 506, the character(s) input into the query input box are processed against the personalized user data. At 508, a search is conducted against an Internet-based index service and search results are returned based on the each character entered and the personalized user data. At 510, the search results are processed, ranked, and utilized to complete the query input in realtime in the query input box.

Figure 6:
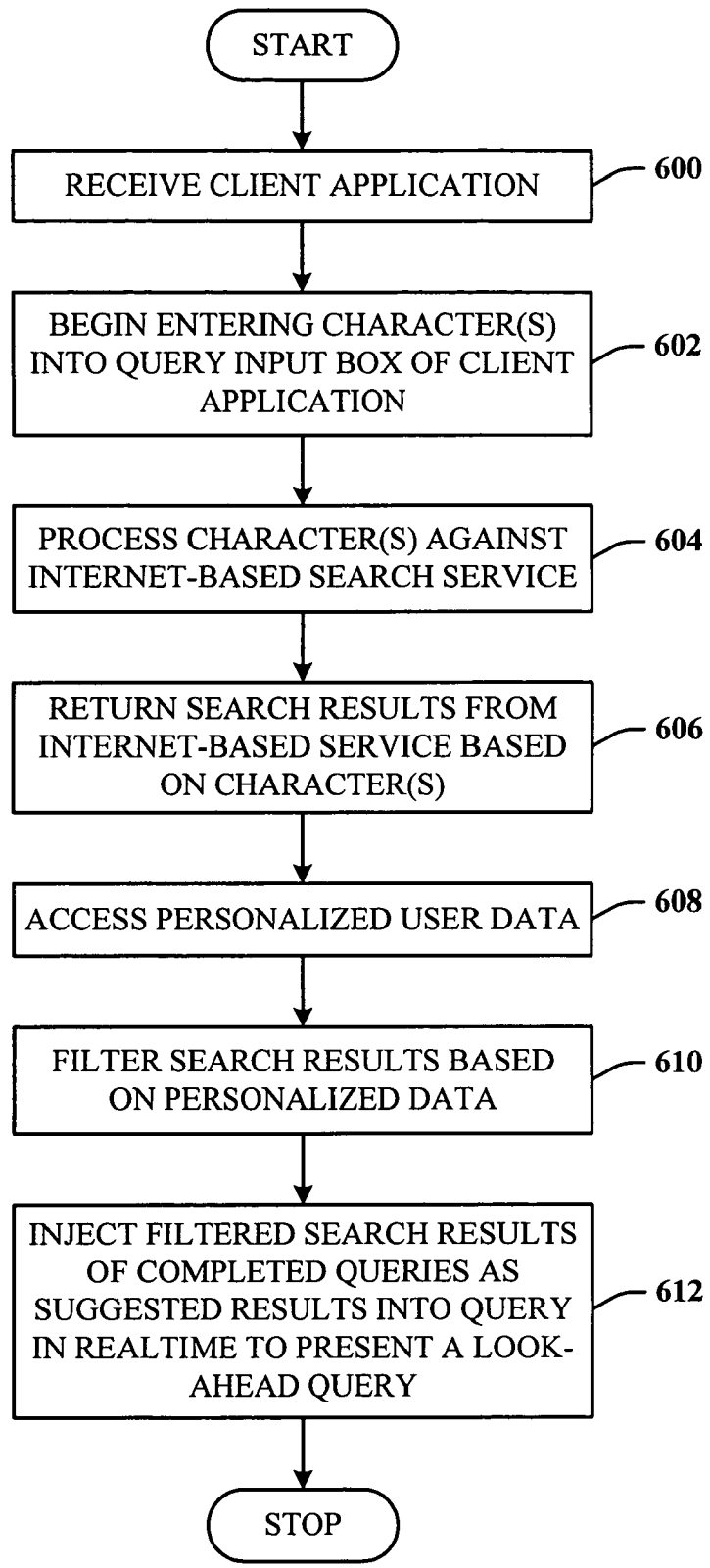
FIG. 6 illustrates a methodology of filtering search results based on personalization data accordance with the disclosed innovation.

Referring now to FIG. 6, there is illustrated a methodology of filtering search results based on personalization data accordance with the disclosed innovation. At 600, a client application is received. At 602, the user enters character(s) into a query input box of the client application. At 604, the character(s) are processed against an Internet-based search service. At 606, the search results are returned form the Internet-based search index service. At 608, personalized user data is accessed. At 610, the search results are filtered using the personalized user data. As indicated supra, the personalized user data can include user preferences, user profile information, historical interaction data, favorites data, and so on. At 612, the filtered search results are used to provide the look-ahead presentation of the query by injecting the search results into the query input box and completing the existing string of query character(s) in realtime.

Figure 7:
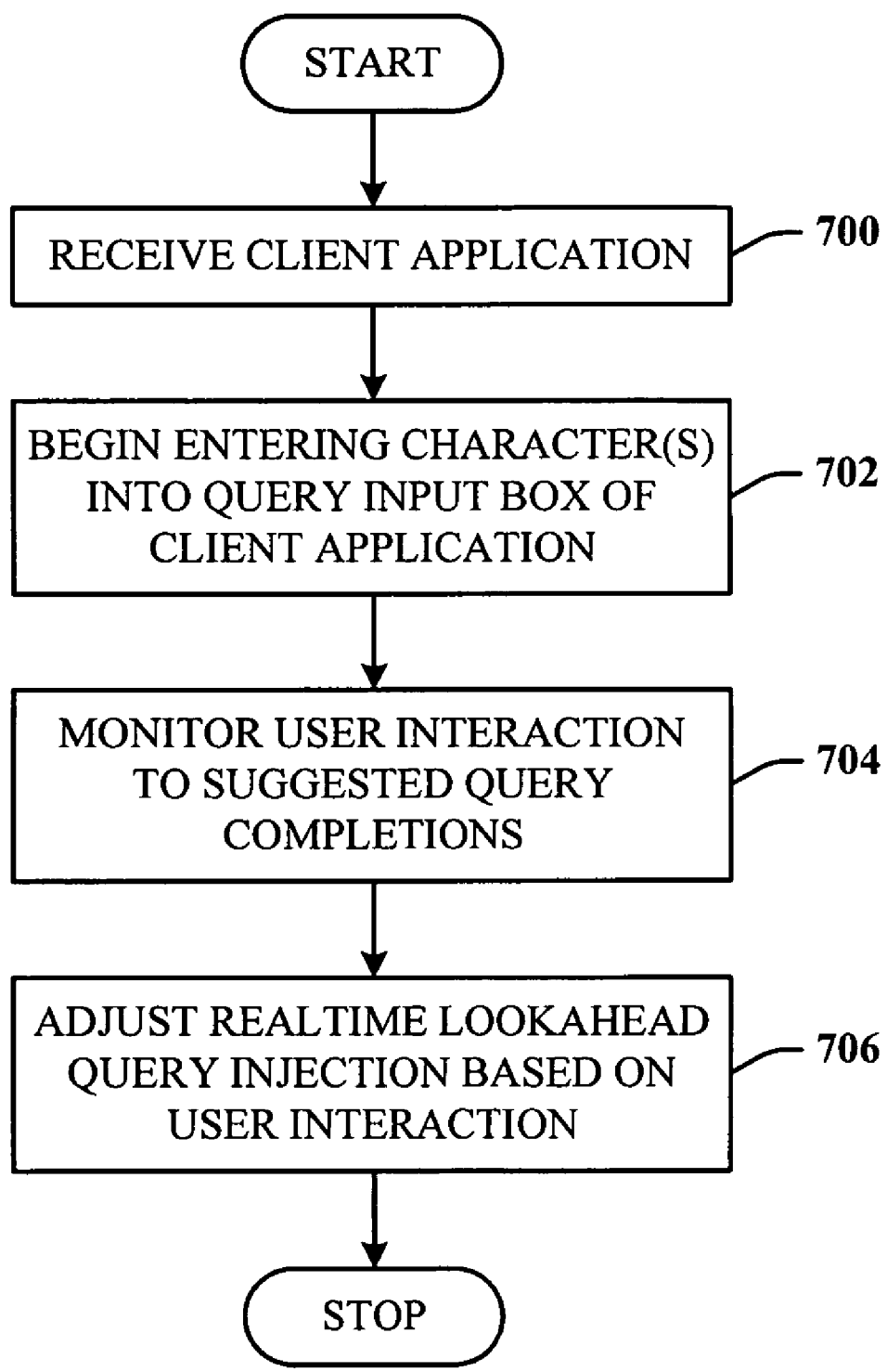
FIG. 7 illustrates a methodology of adaptively adjusting the query process based on user interaction in accordance with another aspect of the innovation.

FIG. 7 illustrates a methodology of adaptively adjusting the query process based on user interaction in accordance with another aspect of the innovation. At 700, a client application is received. At 702, one or more characters are entered by the user in the query input box of the client application. At 704, user interaction is monitored such as entry of keystrokes, query characters, and suggested search results. At 706, the realtime look-ahead query injection is adjusted based on the user interaction. Adjustments can be made based on speed of keystroke entry, accuracy with which the keystrokes are entered, and selection of suggested search results, for example.

Figure 8:
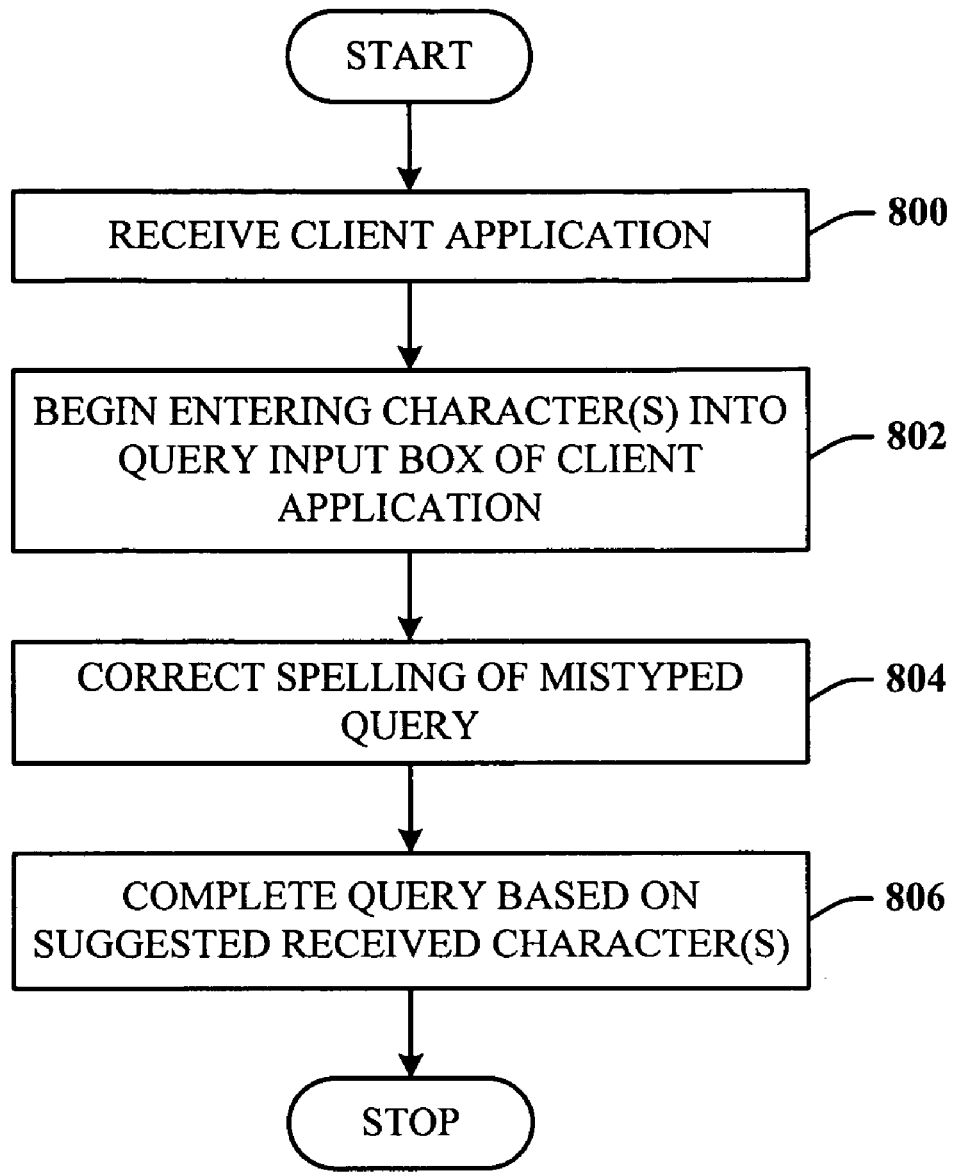
FIG. 8 illustrates a methodology of processing spelling errors in the query process based on user interaction in accordance with another aspect of the innovation.

FIG. 8 illustrates a methodology of processing spelling errors in the query process based on user interaction in accordance with another aspect of the innovation. At 800, a client application is received. At 802, one or more characters are entered in the query input box of the application. At 804, a query word is processed against a dictionary of correctly-spelled words, and a mistyped word is corrected to the correct spelling. Note that this can be a local dictionary and/or an online dictionary. Additionally, this feature can be manually disabled such that the user then manually corrects the misspelled word.

At 806, the query is completed based on the currently received characters. For example, if the user begins to enter the characters b-a-s-e, the system completes the query by automatically entering for the user b-a-l-l as a suggestion. A number of other suggestions can be ranked and provided, such as for example, m-e-n-t for basement, s-t-a-t-i-o-n for base station, and so on.

Figure 9:
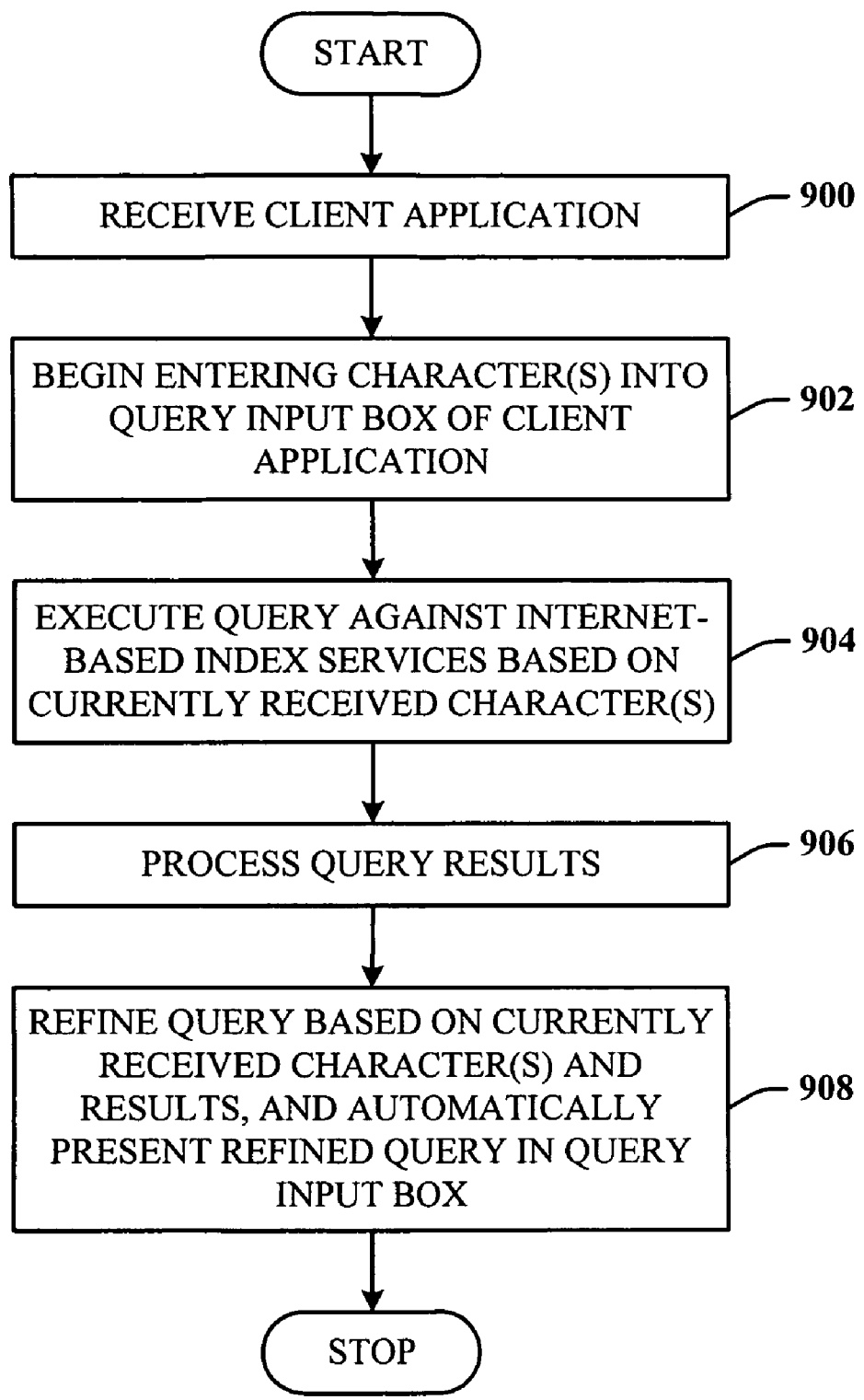
FIG. 9 illustrates a methodology of narrowing a query by refining the query terms in accordance with another aspect of the innovation.

FIG. 9 illustrates a methodology of narrowing a query by refining the query terms in accordance with another aspect of the innovation. At 900, a client application is received. At 902, the user begins entering character(s) into a query input box of the client application. At 904, the query is executed against an Internet-based index service based on the existing character (s) input. At 906, the query results are processed. At 908, the query is refined on the currently received character(s) and results, and the refined query is automatically presented in the query input box. For example, as the user types in b-a-s-e for baseball, the system automatically suggests baseball gloves, since the query baseball is likely too general to return a good set of search results, and baseball gloves is a popular query for which good results are available.

Figure 10:
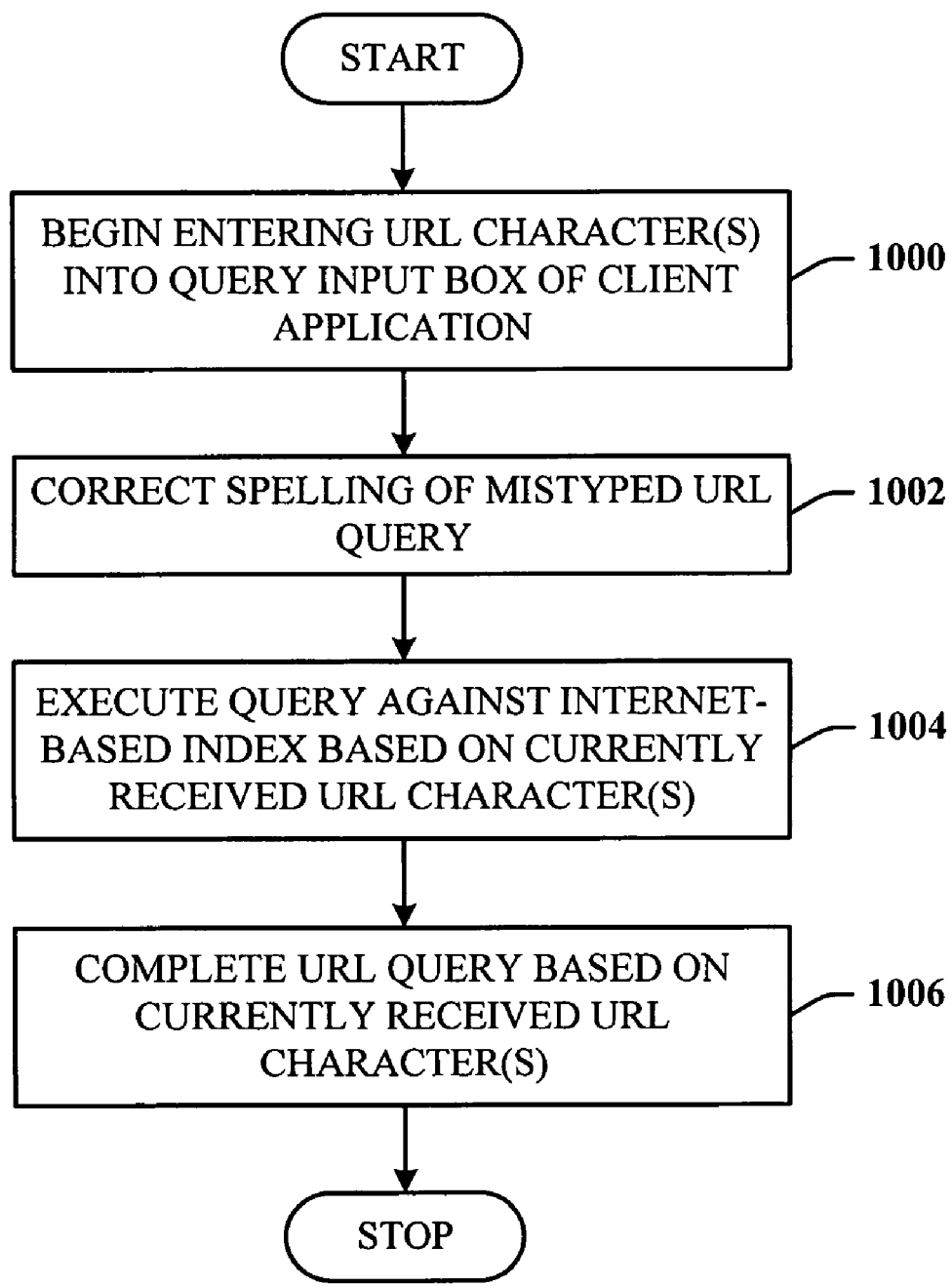
FIG. 10 illustrates a methodology of processing a URL (uniform resource locator) query in accordance with another aspect of the innovation.
Figure 11:
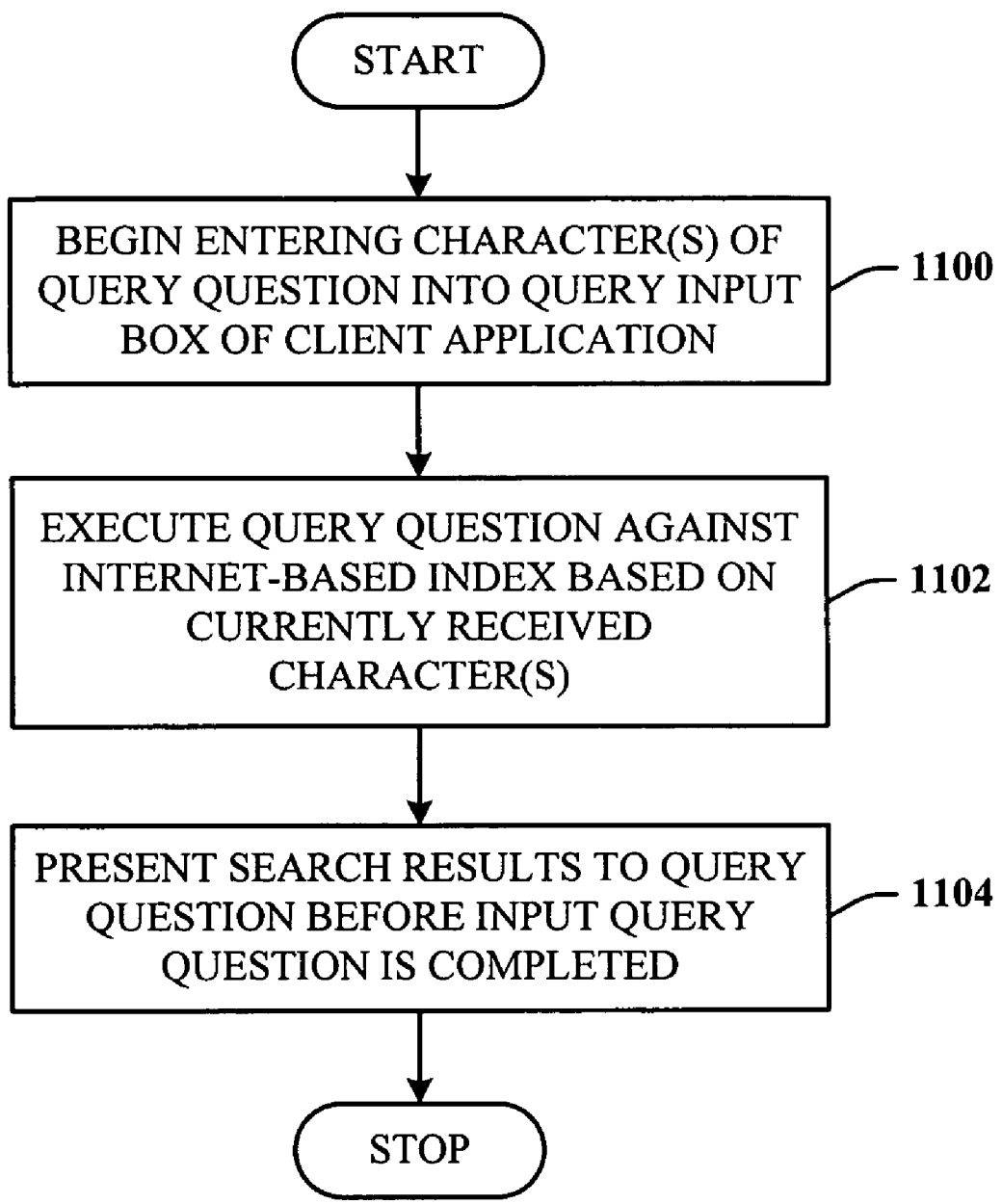
FIG. 11 illustrates a methodology of providing an answer to a query in accordance with another aspect of the innovation.

FIG. 10 illustrates a methodology of processing a URL (uniform resource locator) query in accordance with another aspect of the innovation. At 1000, the user beings entering URL characters into the query input box of a client application. At 1002, the system performs spell correction of any terms used in the URL. At 1004, the query is executed against an Internet-based service based on the currently received URL characters. At 1006, the URL data in the input box is automatically completed for the user in a realtime look-ahead operation based on the existing URL characters provided by the user in the query input box FIG. 11 illustrates a methodology of providing an answer to a query in accordance with another aspect of the innovation. At 1100, the user begins to enter characters of a query question into the query input box of a client application. At 1102, the query is executed against an Internet-based index service based on the currently-provided user input characters. At 1104, a search is performed and the search results returned as an answer to the query question, the answer to which is presented to the user before the user completes entering characters in the query question.

Figure 12:
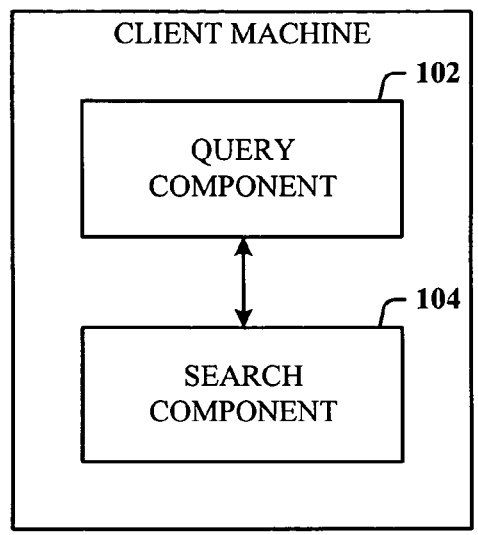
FIG. 12 illustrates a client computing system that employs the realtime look-ahead query processing architecture of the subject innovation.

FIG. 12 illustrates a client computing system 1200 that employs the realtime look-ahead query processing architecture of the subject innovation. The client system 1200 can include only the query component 102 and the search component 104 of FIG. 1 to perform the query process. Aspects related to the capabilities of the system 1200 have been described herein.

Figure 13:
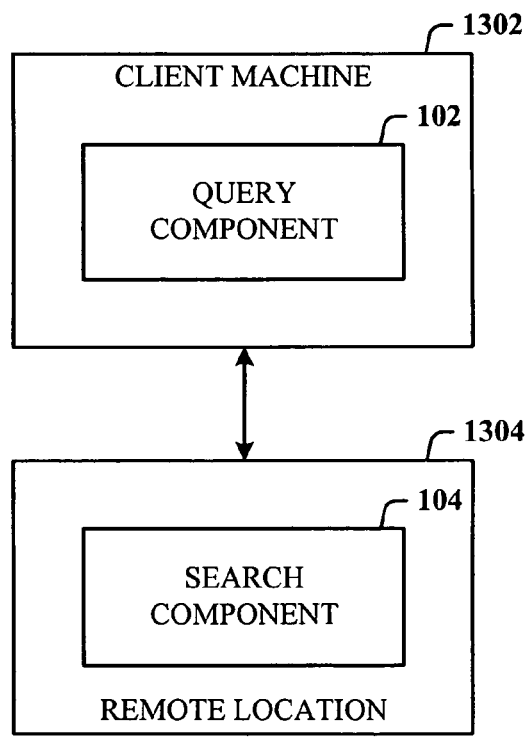
FIG. 13 illustrates an alternative implementation of a system for query processing in accordance with an innovative aspect.

FIG. 13 illustrates an alternative implementation of a system 1300 for query processing in accordance with an innovative aspect. Here, a client machine 1302 includes only the query component 102 and a remote system or location 1304 includes the search component 104. Communications therebetween can be via a wired and/or wireless connection. The system 1300 finds application in an environment where the client machine 1302 can be a desktop computer with limited capability, and the remote location or device can be a peer computing device.

Figure 14:
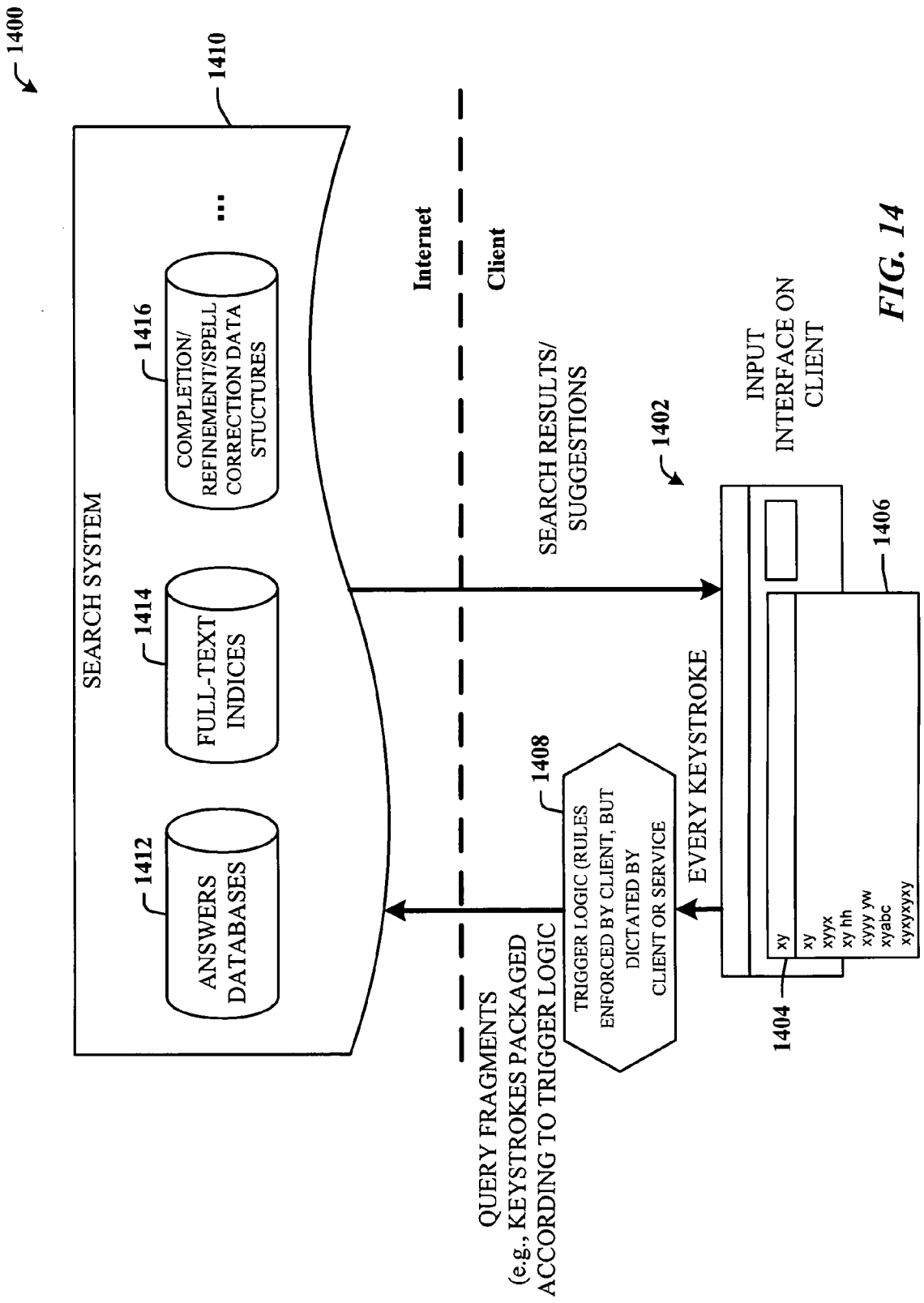
FIG. 14 illustrates a flow overview of a system that represents various aspects of the subject innovation.

FIG. 14 illustrates a flow overview of a system 1400 that represents various aspects of the subject innovation. A client application includes a client input interface 1402 that can include a query input box 1404, and a dropdown history menu 1406 that present previous similar character inputs to the input box. As indicated, when entering characters into the input box 1404, each keystroke made by the user is passed to and processed by a trigger component 1408. As indicated supra, the trigger component 1408 includes trigger logic that can incorporate rules which are enforced by the client but dictated by the client and/or Internet-based service. Each character generated by a keystroke is packaged according to the trigger logic, and utilized in the search against a search system 1410. The search system 1410 can include answers databases 1412, full-text indices 1414, completion/ refinement/spell correction data structures 1416, as well as other services (not shown). As illustrated, each character is passed from the client to the Internet-based search system 1410 for search processing, with the return of search results and suggestions that facilitate realtime look-ahead query completion in the query input box 1404 while the user is entering the characters.

Figure 15:
FIG. 15 illustrates a partial screenshot of a web browser search box in which query characters can be entered.

FIG. 15 illustrates a partial screenshot 1500 of a web browser search box in which query characters can be entered. As the user enters the characters H-o-t, a drop down menu of the more popular results and suggestions are presented offering ranked suggestions. Here, the user selects Hot wheels.

Figure 16:
FIG. 16 illustrates a partial screenshot of a web browser navigation box implementation with similar functionality.

FIG. 16 illustrates a partial screenshot 1600 of a web browser navigation box implementation with similar functionality. Here, as the user enters characters into the query input box, results returned from a favorites list in the form of questions and related statements that include the characters entered at that point in time. For example, entry of the characters D-o-g results in questions being returned such as "Who let the dog out?" and "Dog grooming tips" which are associated with locations that the user accessed previously. Similarly, a History menu presents locations that have been visited in the past, for example, websites associated with "Alaskan sleigh Ride races", "Canine Wonderland", and "German Shepard Weekly".

Figure 17:
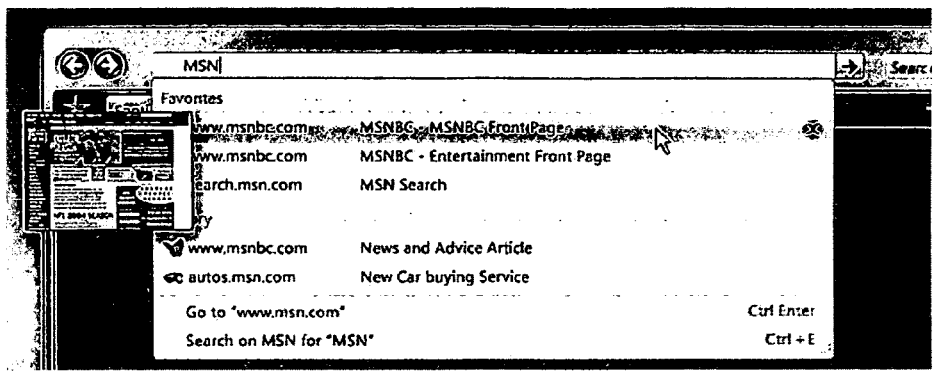
FIG. 17 illustrates a partial screenshot of an alternative web browser navigation box implementation with similar functionality.

FIG. 17 illustrates a partial screenshot 1700 of an alternative web browser navigation box implementation with similar functionality. FIG. 17 shows an actual address box that suggests Internet addresses. Conventionally, if the user types in an address, or mistypes an address in the address box, the browser may come back with a "did you mean . . ." response. This is based on matching characters from a history file on the local machine. The subject innovation receives such suggestions from an Internet-based service that provides the Internet address suggestions, and not just the local suggestions. Here, when the user enters M-S-N, suggested results can be ranked as www.msnbc.com along with a description of the address location website. These can be filtered and ranked based on user favorites and user history, as shown.

Figure 18:
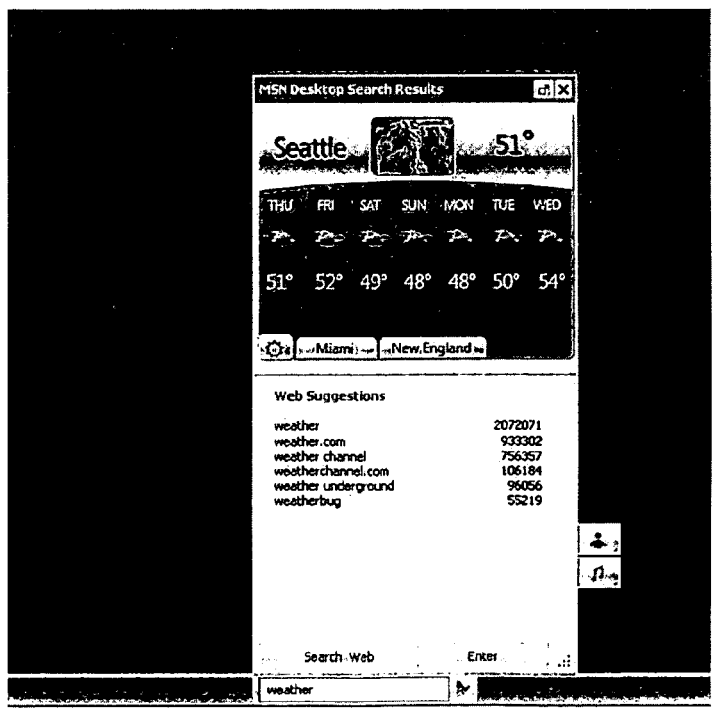
FIG. 18 illustrates a partial screenshot of a query process that presents an answer before the input query has been completely entered.

FIG. 18 illustrates a partial screenshot 1800 of a query process that presents an answer before the input query has been completely entered. Consider that as the user starts typing "w-e-a-t-h-e-r" into a query box, the system immediately suggests the top six queries for weather as ranked information. This is based on the Internet services providing this information, and not the client. Additionally, the client interface has pulled down information from the Internet that it thinks might be an immediate answer to the query. Thus, the query has not been processed yet, but a possible answer is provided. In this example, not only are the top six queries provided, but the top query is processed to present the associated weather for the user's location (e.g., Seattle), along with other locations that the user may have expressed interest in the past (e.g., Miami and New England).

Figure 19:
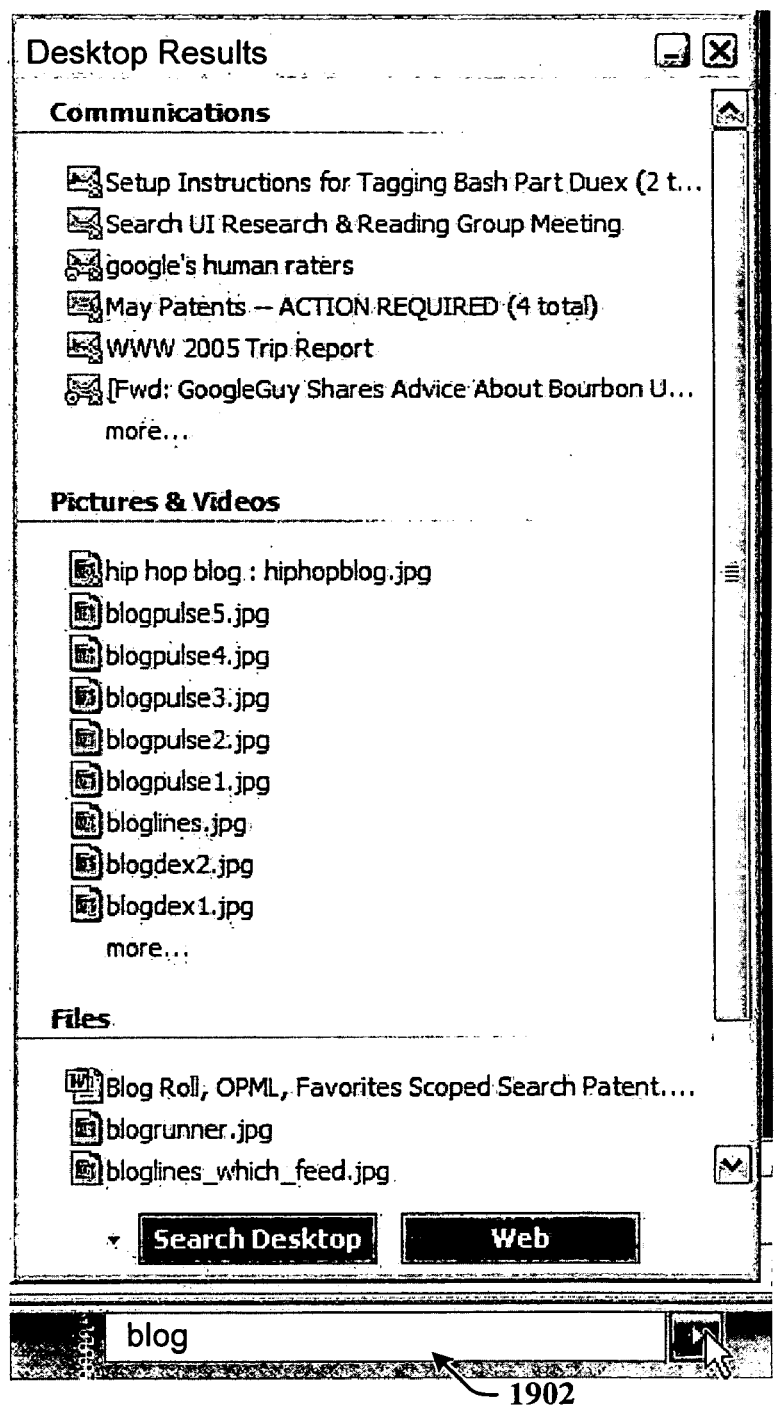
FIG. 19 illustrates a partial screenshot of a user interface that employs a desk bar query input box.

FIG. 19 illustrates a partial screenshot 1900 of a user interface that employs a desk bar query input box 1902. As the user enter b-l-o-g characters into the box 1902, results are returned for blog, and grouped according to communications applications (e.g., an e-mail application), a Pictures and Videos group for images and videos whose filenames include the word blog, and a Files group whose filenames contain the word blog.

Figure 20:
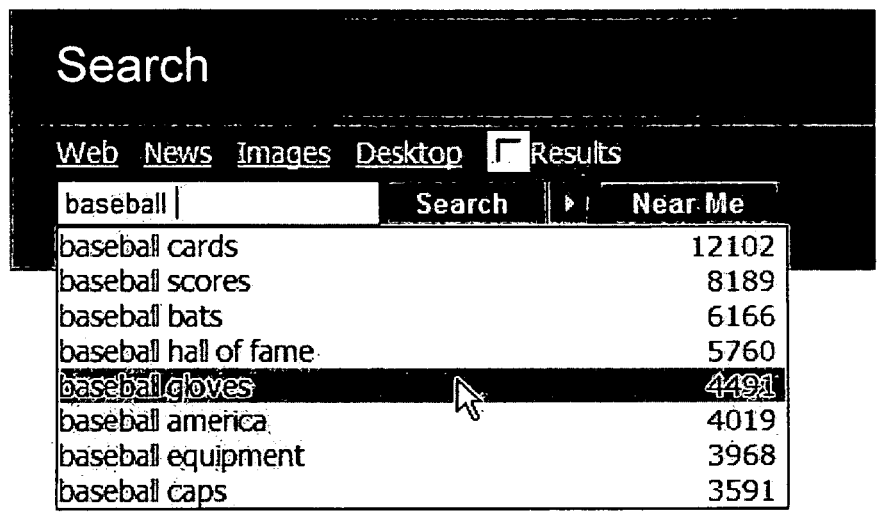
FIG. 20 illustrates a partial screenshot of a query completion and refinement process in accordance with an aspect.

FIG. 20 illustrates a partial screenshot 2000 of a query completion and refinement process in accordance with an aspect. Here, as the user enters baseball, a dropdown menu of refined query suggestions (e.g., baseball gloves, baseball america . . . ) is provided via which the user can make a selection.

Figure 21:
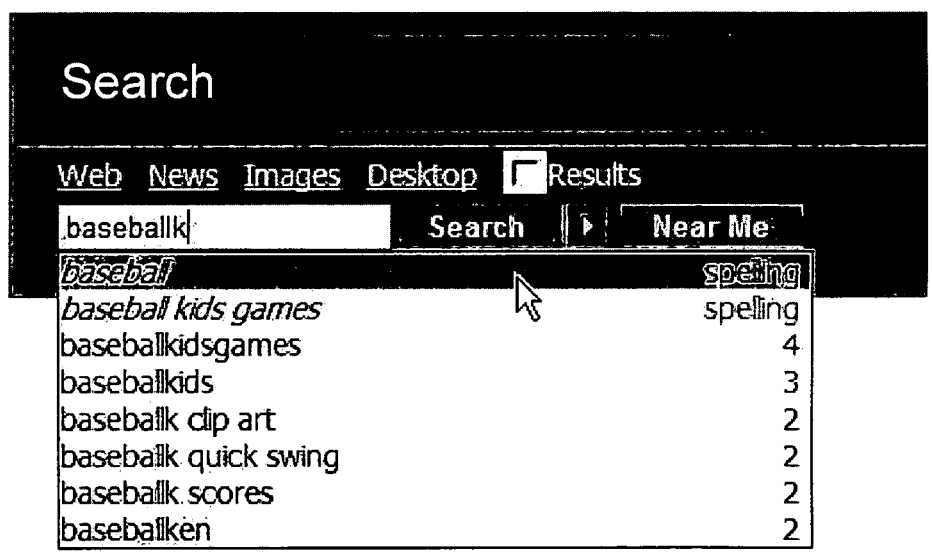
FIG. 21 illustrates a partial screenshot of a query spell correction process in accordance with an aspect.

FIG. 21 illustrates a partial screenshot 2100 of a query spell correction process in accordance with an aspect. Here, the user enters baseballk in the query input box, and the system provides a dropdown menu of suggested correct spellings for search results and refined completed correctly spelled and incorrectly spelled queries (e.g., baseball kids game, baseballkidsgames . . . ) for user perception and selection.

Figure 22:
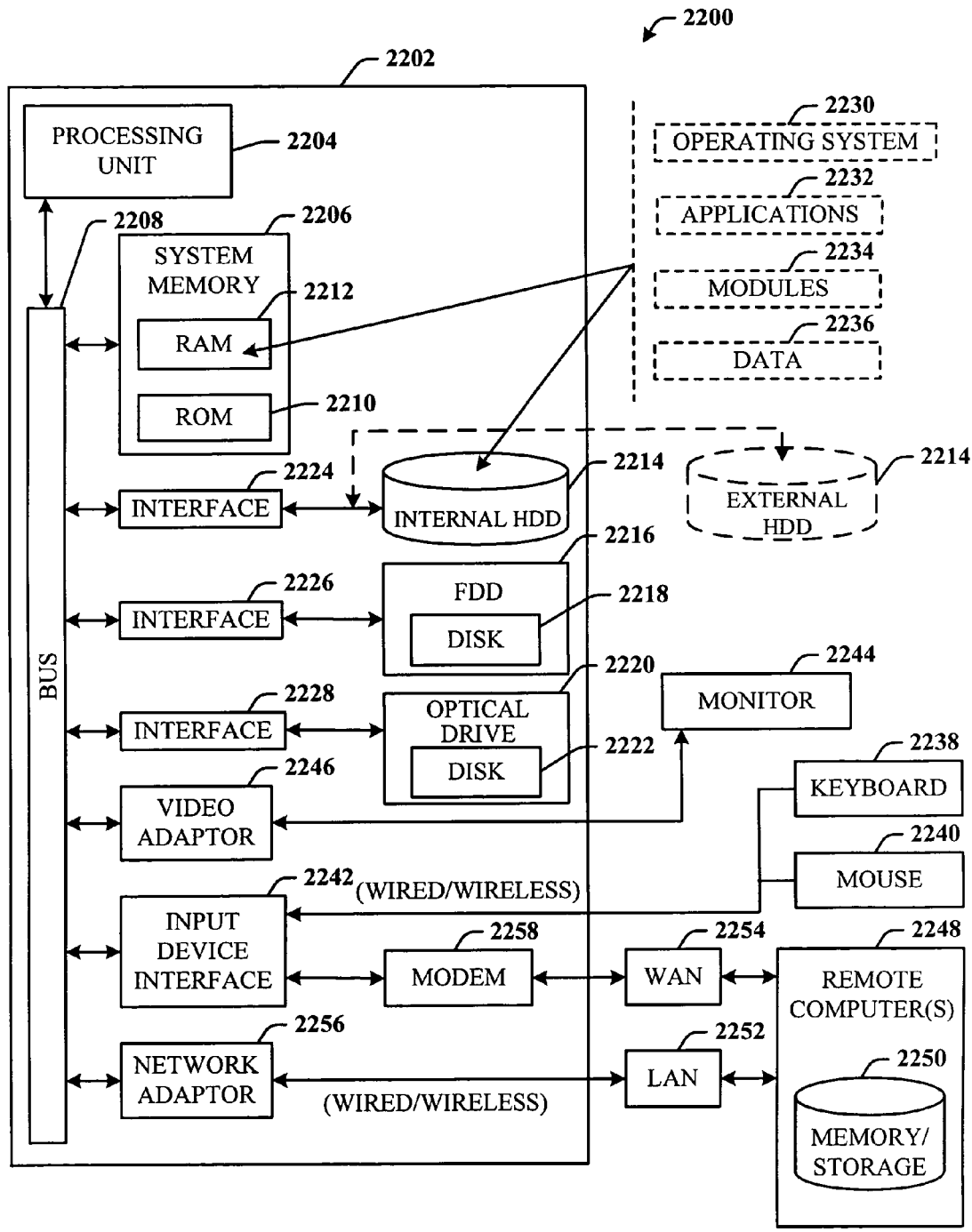
FIG. 22 illustrates a block diagram of a computer operable to execute the disclosed query processing architecture.

Referring now to FIG. 22, there is illustrated a block diagram of a computer operable to execute the disclosed query processing architecture. In order to provide additional context for various aspects thereof, FIG. 22 and the following discussion are intended to provide a brief, general description of a suitable computing environment 2200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 22, the exemplary environment 2200 for implementing various aspects includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read-only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is to be appreciated that the innovation can be implemented with various commercially available operating systems or combinations of operating systems.

A user can enter commands and information into the computer 2202 through one or more wired/wireless input devices, e.g., a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which may connect to a global communications network, e.g., the Internet.

When used in a LAN networking environment, the computer 2202 is connected to the local network 2252 through a wired and/or wireless communication network interface or adapter 2256. The adaptor 2256 may facilitate wired or wireless communication to the LAN 2252, which may also include a wireless access point disposed thereon for communicating with the wireless adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 23:
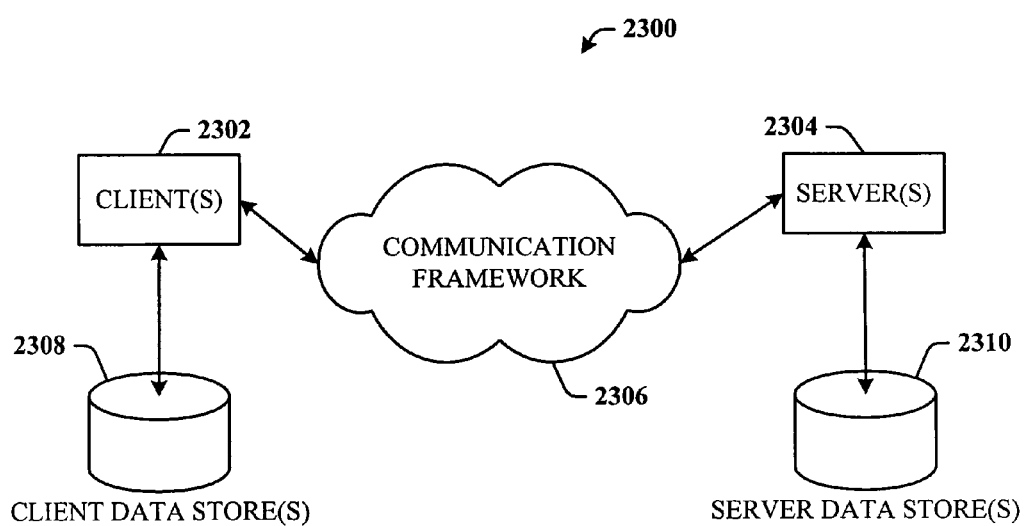
FIG. 23 illustrates a schematic block diagram of an exemplary computing environment that can accommodate the query processing innovation in accordance with another aspect.

Referring now to FIG. 23, there is illustrated a schematic block diagram of an exemplary computing environment 2300 that can accommodate the query processing innovation in accordance with another aspect. The system 2300 includes one or more client(s) 2302. The client(s) 2302 can be hardware and/or software (e.g., threads, processes, computing devices). The client(s) 2302 can house cookie(s) and/or associated contextual information by employing the subject innovation, for example.

The system 2300 also includes one or more server(s) 2304. The server(s) 2304 can also be hardware and/or software (e.g., threads, processes, computing devices). The servers 2304 can house threads to perform transformations by employing the invention, for example. One possible communication between a client 2302 and a server 2304 can be in the form of a data packet adapted to be transmitted between two or more computer processes. The data packet may include a cookie and/or associated contextual information, for example. The system 2300 includes a communication framework 2306 (e.g., a global communication network such as the Internet) that can be employed to facilitate communications between the client(s) 2302 and the server(s) 2304.

Communications can be facilitated via a wired (including optical fiber) and/or wireless technology. The client(s) 2302 are operatively connected to one or more client data store(s) 2308 that can be employed to store information local to the client(s) 2302 (e.g., cookie(s) and/or associated contextual information). Similarly, the server(s) 2304 are operatively connected to one or more server data store(s) 2310 that can be employed to store information local to the servers 2304.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied in a computer readable storage medium that, when executed by one or more processors, facilitates query processing, the system comprising the following computer executable components:

a query component that facilitates input of a portion of query data into a client application during a query generation process, wherein the query generation process comprises automatic injection of additional query data into the client application;

a search component that executes a query against an indexed network based service in real time to suggest the additional query data in response to receiving the portion of the query data and communicates the additional query data to the query component for presentation to a user;

a trigger component that facilitates the inclusion of one or more additional data elements to affect the query generation process and facilitates one or more of impacting, refining, and filtering the additional query data;

an adaptive component that adapts the query generation process to a skill level of the user, wherein the query generation process is more automated when the user is determined to be more skillful and the query generation process is less automated when the user is determined to be more novice; and a machine learning and reasoning component that employs a probabilistic or statistical-based analysis, or a combination thereof, to prognose or infer an action that a user desires to be automatically performed.

2. The system of claim 1, the query component includes a client input box of the client application.

3. The system of claim 1, the query component inputs the suggested additional query data via the client application as a user types one or more characters into the client application.

4. The system of claim 1, the network-based service is an Internet service.

5. The system of claim 1, the query component facilitates input of the suggested additional query data into at least one of a browser search box, a browser navigation box, and a desk bar box, of the client application.

6. The system of claim 1, the query data is a single character that is entered into an input box of the client application.

7. The system of claim 1, the client application is at least one of a word processing application, a browser application, a spreadsheet application, or a presentation application.

8. The system of claim 1, the query data is multiple characters that are entered into an input box of the client application.

9. The system of claim 1, the additional query data is suggested from a cache of results which are stored local to the client application.

10. The system of claim 1, the additional query data is based on personalized search information.

11. The system of claim 1, the additional query data is based on search results that are personalized.

12. A computer-implemented method of processing a query, the method comprising:

employing a processor to execute code instructions stored in a computer readable medium, the code instructions when executed by the processor implement the following acts:

receiving a query character into a query input box of a client application;

searching an Internet-based index service in realtime that returns search results based on the received query character;

suggesting additional query characters in a realtime look-ahead manner, the additional query characters are presented to a user in association with the received query character in response to receiving the search results;

facilitating the inclusion of one or more of the additional query characters and one or more of impacting, refining, and filtering additional query data resulting from the one or more additional query characters;

automatically generating one or more rules to adjust the realtime look-ahead injection of the additional query characters into the query input box of the client application based on user interaction, wherein the realtime look-ahead injection of the additional query characters is more automated when the user interaction indicates the user is more skillful and less automated when the user is indicated to be more novice; and employing a probabilistic or statistical-based analysis, or a combination thereof, to prognose or infer an action that a user desires to be automatically performed.

13. The method of claim 12, further comprising accessing a local cache of most popular queries at least one of in addition to and alternatively to the act of accessing the Internet-based search service.

14. The method of claim 12, further comprising at least one of the acts of: suggesting a refined query based on the search results; and suggesting a completed query based on the search results before all query characters are entered by the user.

15. The method of claim 12, further comprising suggesting spelling corrections of a query spelling based on the search results.

16. The method of claim 12, further comprising: suggesting a correct spelling of URL query data and correcting URL query data based on URL search results; and suggesting a URL to the user based on the URL search results.

17. The method of claim 12, further comprising providing an answer to the query before the query is submitted.

18. A computer-implemented system, comprising:

at least one processor that executes computer readable instructions stored on at least one computer readable medium to effect the following:

means for receiving query characters into a query input box of a client application during a query generation process, wherein the query generation process comprises automatic injection of additional query data into the client application;

means for executing a query against an Internet-based search service in real time that returns search results based on the received query characters;

means for suggesting additional query characters in a real-time look-ahead manner, the additional query characters are presented to a user in association with the received query characters in response to receiving search results;

means for learning to increase or decrease the number of additional query characters presented to the user in the realtime look-ahead manner based on user interaction, wherein learning includes determining based on the user interaction, when a user is a more skilled user or when a user is a more novice user;

a machine learning and reasoning component that employs a probabilistic or statistical-based analysis, or a combination thereof, to prognose or infer an action that a user desires to be automatically performed;

a means for facilitating the inclusion of one or more additional query characters to affect the query generation process and facilitating one or more of impacting, refining, and filtering additional query data; and means for generating one or more rules for suggesting additional query characters based on user interactions and utilizing an automatic classifier system to determine one or more of the rules to apply to suggesting additional query characters.

* * * * *